United States Patent
Jiang et al.

(10) Patent No.: US 10,061,161 B2
(45) Date of Patent: Aug. 28, 2018

(54) METHOD FOR MANUFACTURING ALIGNMENT FILM

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Kun Jiang, Beijing (CN); Wei Zhao, Beijing (CN); Jian Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/283,502

(22) Filed: Oct. 3, 2016

(65) Prior Publication Data

US 2017/0102573 A1 Apr. 13, 2017

(30) Foreign Application Priority Data

Oct. 9, 2015 (CN) .......................... 2015 1 0650573

(51) Int. Cl.
*G02F 1/1368* (2006.01)
*G02F 1/1337* (2006.01)
(Continued)

(52) U.S. Cl.
CPC ........ *G02F 1/13378* (2013.01); *G02F 1/1339* (2013.01); *G02F 1/1341* (2013.01); *G02F 1/133711* (2013.01); *G02F 1/133723* (2013.01)

(58) Field of Classification Search
CPC ......... H01L 2251/5315; H01L 27/3216; H01L 2924/12044; G09G 2300/0426; G09G 2300/0439; G09G 3/3208
See application file for complete search history.

(56) References Cited

U.S. PATENT DOCUMENTS 6,001,277 A * 12/1999 Ichimura ........... G02F 1/133711
252/299.4
8,462,309 B2 * 6/2013 Gotoh ................. H01L 27/1288
349/147
(Continued)

FOREIGN PATENT DOCUMENTS

CN 101075050 B 4/2010
CN 102062968 A 5/2011
(Continued)

OTHER PUBLICATIONS

The First Chinese Office Action dated Nov. 3, 2017; Appln. No. 201510650573.3.

*Primary Examiner* — Tracie Y Green
(74) *Attorney, Agent, or Firm* — Ladas & Parry LLP

(57) ABSTRACT

An embodiment of the present disclose provides a method for manufacturing alignment film, including: providing a mixture of a liquid crystal material and an alignment film precursor material; filling the mixture of the liquid crystal material and the alignment film precursor material between an upper substrate and a lower substrate to form a mixed liquid crystal layer; sealing the mixed liquid crystal layer in a liquid crystal cell; aligning the liquid crystal material in the mixed liquid crystal layer in a first predetermined direction; gathering the alignment film precursor material in the mixed liquid crystal layer onto at least one the upper substrate and the lower substrate; and curing the alignment film precursor material gathered on the at least one of the upper substrate and the lower substrate to form an alignment film, wherein an alignment channel in a second predetermined direction is formed in the alignment film.

20 Claims, 3 Drawing Sheets

(51) Int. Cl.
*G02F 1/1339* (2006.01)
*G02F 1/1341* (2006.01)

(56) References Cited

U.S. PATENT DOCUMENTS

| | | | |
|---|---|---|---|
| 9,275,568 B2* | 3/2016 | Peng | G09G 3/006 |
| 2008/0018845 A1 | 1/2008 | Choi | |
| 2010/0245699 A1* | 9/2010 | Gotoh | H01L 27/1288 |
| | | | 349/46 |
| 2015/0109274 A1* | 4/2015 | Yoshioka | G09G 3/3648 |
| | | | 345/209 |
| 2015/0275089 A1* | 10/2015 | Katano | G02F 1/133723 |
| | | | 349/124 |

FOREIGN PATENT DOCUMENTS

| | | |
|---|---|---|
| CN | 102220141 A | 10/2011 |
| CN | 102629012 A | 8/2012 |
| JP | 2003-279946 A | 10/2003 |

* cited by examiner

METHOD FOR MANUFACTURING ALIGNMENT FILM

TECHNICAL FIELD

Embodiments of the present disclose relates to a method for manufacturing an alignment film.

BACKGROUND

A liquid crystal display device has advantages of low power consumption, no radiation, etc., and plays a leading role in a field of flat panel display.

A liquid crystal panel in the related liquid crystal display device usually comprises an array substrate and a color filter substrate arranged opposite to each other, and a liquid crystal layer filled between the array substrate and the color filter substrate, wherein the array substrate is provided with a plurality of thin film transistors and a plurality of pixel electrodes, the pixel electrodes are connected to drain electrodes of the thin film transistors, and the color filter substrate is provided with the common electrode corresponding to the pixel electrodes. When the pixel electrode is charged via the thin film transistor, an electric field is formed between the pixel electrode and the common electrode, so as to control liquid crystal molecules in a corresponding liquid crystal region of the pixel electrode to deflect and further realizing a liquid crystal display function. Generally, in order to align the liquid crystal molecules in certain direction, such liquid crystal panel has an alignment film set to form a certain pretilt angle. A known method for manufacturing the alignment film is a rubbing processing method, including rubbing a thin film formed on a substrate and made of a macromolecular compound such as polyimide in a direction with a cloth such as artificial silk, etc.

SUMMARY

An embodiment of the present disclose provides a method for manufacturing alignment film, including: providing a mixture of a liquid crystal material and an alignment film precursor material; filling the mixture of the liquid crystal material and the alignment film precursor material between an upper substrate and a lower substrate to form a mixed liquid crystal layer; sealing the mixed liquid crystal layer in a liquid crystal cell; aligning the liquid crystal material in the mixed liquid crystal layer in a first predetermined direction; gathering the alignment film precursor material in the mixed liquid crystal layer onto at least one the upper substrate and the lower substrate; and curing the alignment film precursor material gathered on the at least one of the upper substrate and the lower substrate to form an alignment film, wherein an alignment channel in a second predetermined direction is formed in the alignment film.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

With development of a liquid crystal panel industry, in particular constant development of a small-sized high Pixels Per Inch (PPI) product, because alignment abnormality of a rubbed alignment film caused by unevenness of a color filter (CF) substrate and a thin film transistor (TFT) substrate is more and more obvious, a photo-aligning alignment film technology is developed to solve this problem. A photochemical reaction of polarization ultraviolet rays to an alignment material is used to form an alignment channel to perform alignment. But the method has an insufficient alignment force caused by an insufficient photochemical reaction intensity, and the reaction is a chain scission reaction and inevitably generates small molecular active groups, leading to a poor panel display, in particular generation of a poor residual image.

An embodiment of the present embodiment provides a method for manufacturing alignment film, capable of reducing the generation of the small active groups in the alignment film and avoiding defects such as a residual image.

The technical solutions of the embodiments in this disclosure are clearly and completely described in combination with the drawings. It is obvious that the described embodiments are just a part but not all of the embodiments of the disclosure. It is noted that without conflict, the embodiments and features of the embodiments in this disclosure can be combined with one another. Based on the described embodiments herein, those skilled in the art can obtain other embodiment(s), without any inventive work, which should be within the scope of the disclosure.

Figure 1:
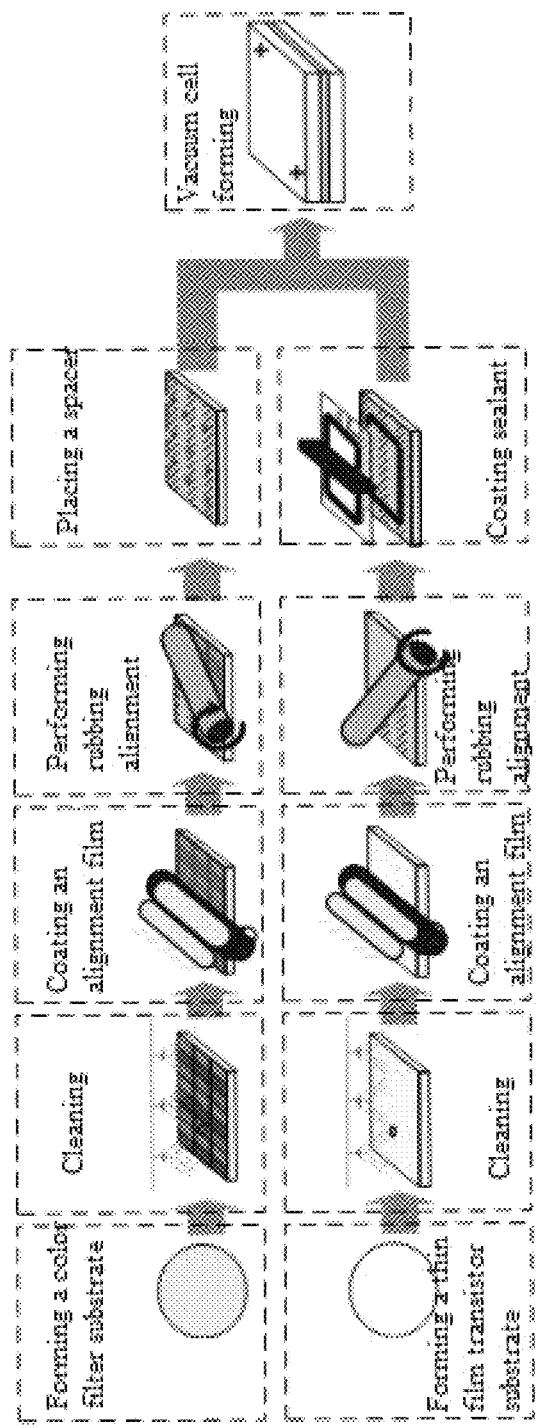
FIG. 1 is a schematic diagram of a liquid crystal cell process flow in a related art.

As shown in FIG. 1, in a related art, a method for manufacturing a liquid crystal cell basically includes: forming a color filter substrate and a TFT array substrate, cleaning, coating an alignment film, carrying out rubbing alignment, setting a spacer, coating sealant, injecting liquid crystal, and performing vacuum cell forming, etc. But alignment film rubbed by such method has more and more obvious alignment abnormality which leads to a poor liquid crystal display.

Figure 2:
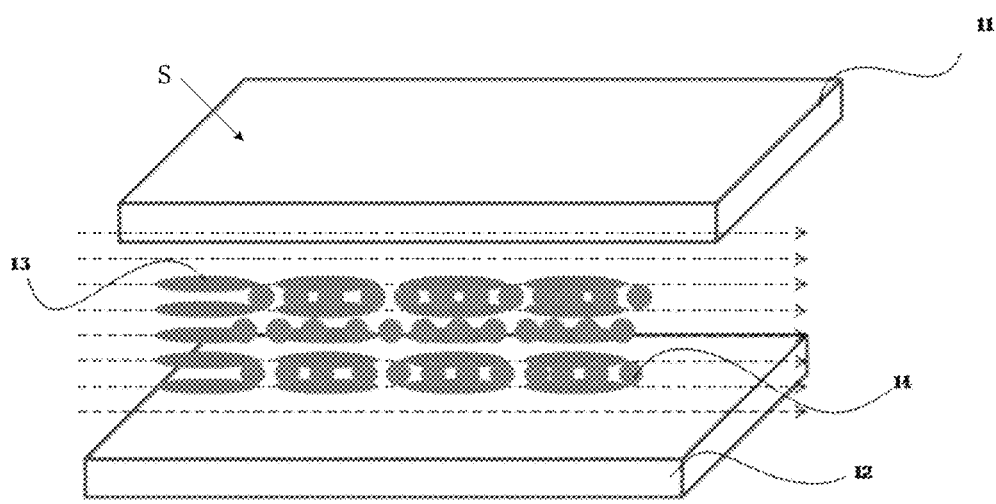
FIG. 2 is an internal structural diagram of a mixed liquid crystal layer in a formed liquid crystal cell in a manufacturing method provided by an embodiment of the present disclosure.
Figure 3:
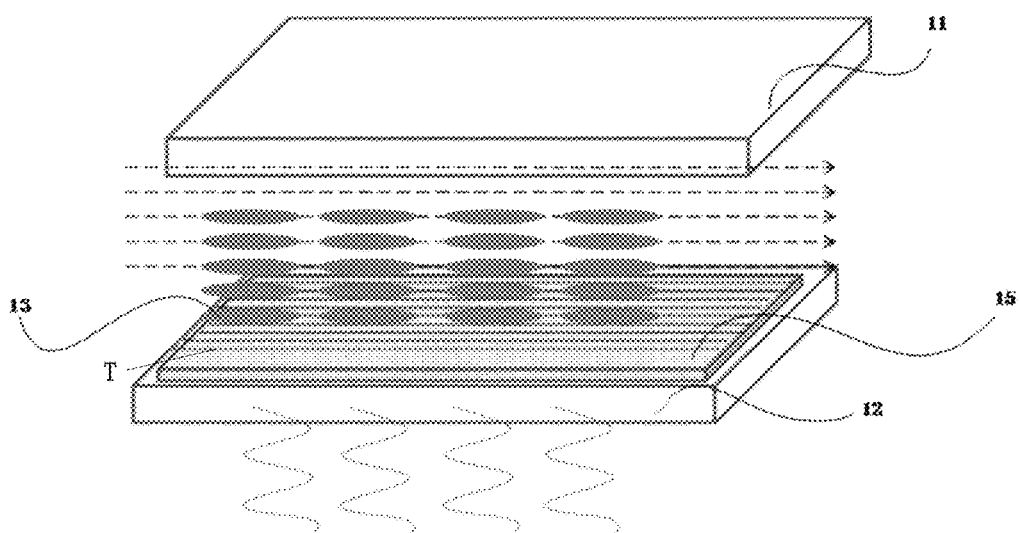
FIG. 3 is a structural schematic diagram of an alignment film formed by applying microwave to the liquid crystal cell as shown in FIG. 2.

As shown in FIG. 2 and FIG. 3, an embodiment of the present disclosure provides a method for manufacturing alignment film, including steps of: providing a mixture of a liquid crystal material and an alignment film precursor material 14; filling the mixture of the liquid crystal material and the alignment film precursor material 14 between an upper substrate 11 and a lower substrate 12 to form a mixed liquid crystal layer; sealing the mixed liquid crystal layer in a liquid crystal cell; aligning the liquid crystal material in the mixed liquid crystal layer in a first predetermined direction; gathering the alignment film precursor material 14 in the mixed liquid crystal layer onto one of the upper substrate 11 and the lower substrate 12; and curing the alignment film precursor material 14 gathered on the one of the upper substrate 11 and the lower substrate 12 to form an alignment film, wherein an alignment channel in a second predetermined direction is formed in the alignment film.

The method for manufacturing alignment film disclosed by the embodiment of the present disclosure is explained in detail as follows.

The mixture of the liquid crystal material and the alignment film precursor material needs to be prepared before forming the alignment film. The material of the alignment film is, for example, polyimide, and a precursor material of the polyimide is polyamide acid. For example, the alignment film precursor material is dissolved in the liquid crystal material, and the alignment film precursor material is, for example, polyamide acid. Because the alignment film precursor material and the liquid crystal are both organic materials and are good in intersolubility. In the mixture (solution) of the liquid crystal material and the alignment film precursor material, a volume percentage of the alignment film precursor material (solute) is in a range of 2-4%. That is, the volume of the alignment film precursor material is 2-4% of the total volume of the mixture of the liquid crystal material and the alignment film precursor material. If an amount of the alignment film precursor material is too small, a thickness of the alignment film is not large enough, which finally causes insufficient alignment, and quality of liquid crystal display is affected. If the alignment film precursor material is too much, an overlarge thickness of the alignment is caused and uneven display is caused; and additionally, if the alignment film precursor material is too much, a problem that the alignment film precursor material cannot be dissolved in the liquid crystal material is caused. It should be understood that the embodiments of the present disclosure are not limited thereto. The alignment film can also be made of other materials. Similarly, the corresponding alignment film precursor material can be adopted to mix with the liquid crystal material. The liquid crystal material is, for example, liquid crystal molecules. In order to avoid damage to the liquid crystal molecules 13 in a subsequent process of forming alignment film, the liquid crystal material is, for example, a radiation resistant and high temperature resistant material.

The sealant is coated on one of the upper substrate 11 and the lower substrate 12, and the mixture of the liquid crystal material and the alignment film precursor material 14 is filled between the upper substrate 11 and the lower substrate 12; the upper substrate 11 and the lower substrate 12 are cell-assembled to form a liquid crystal cell, and the mixture diffuses to form a mixed liquid crystal layer sealed in the liquid crystal cell.

As shown in FIG. 2, the formed liquid crystal cell is placed in a strong electric field, and an electric field is applied to the mixed liquid crystal layer to align the mixed liquid crystal layer in a predetermined direction. That is, the liquid crystal molecules 13 in the mixed liquid crystal layer in the liquid crystal cell are arranged in the predetermined first predetermined direction under the action of the electric field. A direction of the electric field is parallel to a plane where the liquid crystal cell is located. Here, the plane where the liquid crystal cell is located is, for example, the plane where an upper surface S of the upper substrate 11 is located. An intensity of the electric field is, for example, greater than $10^4$ N/C. The higher the electric field intensity is, the more the liquid crystal alignment is facilitated.

As shown in FIG. 3, after the liquid crystal molecules 13 in the mixed liquid crystal layer of the liquid crystal cell are aligned in the first predetermined direction, the electric field is kept unchanged and gather the alignment film precursor material 14 in the mixed liquid crystal layer onto one of the upper substrate 11 and the lower substrate 12. The manner of gathering the alignment film precursor material 14 in the mixed liquid crystal layer onto one of the upper substrate 11 and the lower substrate 12 may be selected from a mechanical vibration processing and/or placing the liquid crystal cell in a microwave environment and applying microwave to the liquid crystal cell. For example, the microwave is applied to the liquid crystal cell. For example, first microwave is applied to the liquid crystal cell, a wavelength range of the first microwave is 10-50 mm, the microwave energy of such wavelength is sufficient to further polymerize the polyamide acid molecules, so that the molecular weight increases and the molecules are separated from the liquid crystal material and adhered to the substrates. If the wavelength is too small, polyamide acids will be bridged to form polyimide which is free in the liquid crystal, instead of being adsorbed to the substrate to achieve an alignment action.

As shown in FIG. 3, Because an aggregation action of the polyamide acid molecules is weak, the polar polyamide acid organic molecules oscillate left and right under the radiation action of the first microwave with a relative low energy and generate heat; the molecular weight increases gradually, and when molecular weight increases to certain quantity, solubility of the polyamide acid in the liquid crystal material is reduced, while its adhesion force is increased; thus the polyamide acid is separated out from the liquid crystal and adhered to one of the upper substrate 11 and the lower substrate 12 under an external slight mechanical vibration action to form a polyamide acid thin film. Because the molecular weight of the polyamide acid increases in an exponential order, a viscosity of the low molecular weight molecules is low and its reactivity is far higher than that of the high molecular weight molecules, and therefore, possibility of residue in the liquid crystal is very small. The dissolve state of the polyamide acid molecules in the liquid crystal material is damaged by radiating the first microwave and/or separating by mechanical vibration, the polyamide acid molecules are separated out and adsorbed to one of the upper substrate 11 and the lower substrate 12, thereby finishing the process of gathering the alignment film precursor material 14 onto one of the upper substrate 11 and the lower substrate 12. In the process of gathering the alignment film precursor material 14 onto one of the upper substrate 11 and the lower substrate 12, the reaction can be quickened by heating the liquid crystal cell to quicken separation and aggregation of the alignment film precursor material 14 onto one of the upper substrate 11 and the lower substrate 12.

As shown in FIG. 3, the alignment film precursor material 14 gathered on the one of the upper substrate 11 and the lower substrate 12 is cured to form an alignment film 15, in which an alignment channel T in a second predetermined direction is formed. This process can be executed by heating the liquid crystal cell and/or placing the liquid crystal cell in a microwave environment and applying microwave to the liquid crystal cell. For example, the microwave is applied to the liquid crystal cell. Here, the first predetermined direction is, for example, the same as the second predetermined direction. However, the embodiments of the present disclosure are not limited thereto, and in another embodiment, the first predetermined direction can be different from the second predetermined direction. For example, second microwave is applied to the one of the upper substrate 11 and the lower substrate 12, and a wavelength range of the second microwave is limited to about 1-5 mm. The second microwave supplies energy to the alignment film precursor material 14; under the action of the second microwave, the polyamide acid molecules of the alignment film precursor material 14 gathered to one of the upper substrate 11 and the lower substrate 12 is subjected to isomerization reaction to generate polyimide which is the alignment film material. Due to an oriented alignment action of the liquid crystal molecules 13, after isomerization, the alignment film precursor material 14 forms an alignment channel in a corresponding direction, thereby finishing the forming and alignment process of the alignment film 15. For example, the second microwave with short wavelength range of about 1-5 mm have enough energy to make the polar molecules vibrate dramatically and generate massive heat, to perform isomerization on the polyamide acid molecules, thereby forming a fixed polyimide thin film. The second microwave provides energy required for the isomerization of the polyamide acid, and a reaction speed can be quickened by heating. The liquid crystal cell can be heated to quicken the curing reaction process, thereby quickening the isomerization of the polyamide acid molecules of the alignment film precursor material 14 gathered to one of the upper substrate 11 and the lower substrate 12 to form the polyimide thin film and quickening the curing.

As shown in FIG. 2 and FIG. 3, under the action of the strong electric field, double actions of a Van der Waals' force and an electrostatic force exist between the liquid crystal molecules 13 aligned in the predetermined direction and the gradually formed polyamide acid molecules; because the crystal molecules 13 have a rodlike structure, in the isomerization process of the polyimide molecules, configuration and conformation of high molecular coils will yield to the arrangement of the crystal molecules 13 so as to be aligned in certain direction; and after the polyimide thin film is formed, the channel is fixed. When an external electric field is removed, the crystal molecules 13 will keep the arrangement when the external electric field exists due to the Van der Waals' force and electrostatic force till another electric field changes it.

In conclusion, according to the method for manufacturing alignment film provided in the embodiments of the present disclosure, the alignment film precursor material 14 of the alignment film is dissolved in the liquid crystal material, under the action of strong electric field, the liquid crystal is aligned in a specific direction, the alignment film precursor material 14 is gathered to one of the upper substrate 11 and the lower substrate 12 under the action of the first microwave and is cured under the action of the specific second microwave to form the alignment film; and due to a fixed arrangement of the liquid crystal molecules 13, the alignment film is aligned according to the arrangement direction of the liquid crystal molecules 13, to form an alignment channel. The steps of coating the alignment film material and performing rubbing alignment are omitted, thereby greatly simplifying the related process flow of alignment film curing and forming; meanwhile, due to the reaction is isomerization reaction, no active small groups are generated in the reaction, and generation of defects such as a residual image is avoided. In addition, since the liquid crystal molecules are adopted to form the channel, the alignment force is far higher than that of photo-alignment and a display effect is better.

For example, in the present embodiment, the alignment film precursor material 14 in the mixed liquid crystal layer is aggregated to the lower substrate 12. However, the embodiments of the present disclosure are not limited thereto. In another embodiment, the alignment film precursor material 14 in the mixed liquid crystal layer can be aggregated to the upper substrate 11. In a further embodiment, the alignment film precursor material 14 in the mixed liquid crystal layer is aggregated to the upper substrate 11 and the lower substrate 12 simultaneously.

Although the embodiment of the disclosure has been described above in great detail with general descriptions and specific embodiments, on the basis of the embodiment of the disclosure, various changes and improvements may be made, which is apparent to those skilled in the art. Therefore, all such changes and improvements without departing from the spirit of the disclosure are within the scope of the claims of the disclosure.

The application claims priority of Chinese Patent Application No. 201510650573.3 filed on Oct. 9, 2015, the disclosure of which is incorporated herein by reference in its entirety as part of the present application.

The invention claimed is:

1. A method for manufacturing alignment film, comprising:
    providing a mixture of a liquid crystal material and an alignment film precursor material;
    filling the mixture of the liquid crystal material and the alignment film precursor material between an upper substrate and a lower substrate to form a mixed liquid crystal layer;
    sealing the mixed liquid crystal layer in a liquid crystal cell;
    aligning the liquid crystal material in the mixed liquid crystal layer in a first predetermined direction;
    gathering the alignment film precursor material in the mixed liquid crystal layer onto at least one the upper substrate and the lower substrate; and
    curing the alignment film precursor material gathered on the at least one of the upper substrate and the lower substrate to form an alignment film, wherein an alignment channel in a second predetermined direction is formed in the alignment film.

2. The method for manufacturing alignment film according to claim 1, wherein, in the mixture of the liquid crystal material and the alignment film precursor material, a volume percentage of the alignment film precursor material is in a range of 2-4%.

3. The method for manufacturing alignment film according to claim 1, wherein the alignment film precursor material is polyamide acid.

4. The method for manufacturing alignment film according to claim 1, wherein the aligning the liquid crystal material in the mixed liquid crystal layer in a first predetermined direction includes applying an electric field to the mixed liquid crystal layer.

5. The method for manufacturing alignment film according to claim 4, wherein an intensity of the electric field is greater than or equal to $10^4$ N/C.

6. The method for manufacturing alignment film according to claim 4, wherein a direction of the electric field is parallel to a plane where the liquid crystal cell is located.

7. The method for manufacturing alignment film according to claim 1, wherein the gathering the alignment film precursor material in the mixed liquid crystal layer onto at least one of the upper substrate and the lower substrate includes applying a first microwave and/or high frequency mechanical vibration to the liquid crystal cell.

8. The method for manufacturing alignment film according to claim 7, wherein, the gathering the alignment film precursor material in the mixed liquid crystal layer onto at least one of the upper substrate and the lower substrate is performed by applying the first microwave to the liquid crystal cell, a wavelength range of the first microwave is 10-50 mm.

9. The method for manufacturing alignment film according to claim 1, wherein the curing the alignment film precursor material gathered on the at least one of the upper substrate and the lower substrate to form an alignment film includes applying a second microwave to the at least one of the upper substrate and the lower substrate.

10. The method for manufacturing alignment film according to claim 9, wherein a wavelength range of the second microwave is 1-5 mm.

11. The method for manufacturing alignment film according to claim 1, wherein the gathering the alignment film precursor material in the mixed liquid crystal layer onto at least one of the upper substrate and the lower substrate includes heating the liquid crystal cell.

12. The method for manufacturing alignment film according to claim 1, wherein the curing the alignment film precursor material gathered on the at least one of the upper substrate and the lower substrate to form an alignment film includes heating the liquid crystal cell.

13. The method for manufacturing alignment film according to claim 11, wherein the liquid crystal material is a radiation resistant and high temperature resistant material.

14. The method for manufacturing alignment film according to claim 7, wherein the gathering the alignment film precursor material in the mixed liquid crystal layer onto the upper substrate and the lower substrate includes heating the liquid crystal cell.

15. The method for manufacturing alignment film according to claim 9, wherein the curing the alignment film precursor material gathered on the at least one of the upper substrate and the lower substrate to form an alignment film further includes heating the liquid crystal cell.

16. The method for manufacturing alignment film according to claim 1, wherein the first predetermined direction is identical to the second predetermined direction, and both the first predetermined direction and the second predetermined direction are parallel to the plane where the liquid crystal cell is located.

17. The method for manufacturing alignment film according to claim 2, wherein the aligning the liquid crystal material in the mixed liquid crystal layer in a first predetermined direction includes applying an electric field to the mixed liquid crystal layer.

18. The method for manufacturing alignment film according to claim 3, wherein the aligning the liquid crystal material in the mixed liquid crystal layer in a first predetermined direction includes applying an electric field to the mixed liquid crystal layer.

19. The method for manufacturing alignment film according to claim 17, wherein an intensity of the electric field is greater than or equal to $10^4$ N/C.

20. The method for manufacturing alignment film according to claim 18, wherein an intensity of the electric field is greater than or equal to $10^4$ N/C.

* * * * *